United States Patent
Heaton

(10) Patent No.: US 8,244,076 B2
(45) Date of Patent: Aug. 14, 2012

(54) TUNEABLE ELECTRO-OPTIC MODULATOR

(75) Inventor: John Heaton, Malvern (GB)

(73) Assignee: U2T Photonics UK Limited, London (GB)

( * ) Notice: Subject to any disclaimer, the term of this patent is extended or adjusted under 35 U.S.C. 154(b) by 579 days.

(21) Appl. No.: 12/304,862

(22) PCT Filed: Jun. 14, 2007

(86) PCT No.: PCT/GB2007/002203
§ 371 (c)(1),
(2), (4) Date: Sep. 28, 2009

(87) PCT Pub. No.: WO2007/144617
PCT Pub. Date: Dec. 21, 2007

(65) Prior Publication Data
US 2010/0027936 A1  Feb. 4, 2010

(30) Foreign Application Priority Data
Jun. 14, 2006 (GB) .................................. 0611703.0

(51) Int. Cl.
*G02F 1/035* (2006.01)

(52) U.S. Cl. ................................. 385/3; 385/2

(58) Field of Classification Search ........................ 385/3
See application file for complete search history.

(56) References Cited

U.S. PATENT DOCUMENTS

| | | | | |
|---|---|---|---|---|
| 4,772,084 | A * | 9/1988 | Bogert ............................. | 385/40 |
| 6,583,917 | B2 * | 6/2003 | Melloni et al. ................. | 359/245 |
| 2008/0266639 | A1 * | 10/2008 | Melloni et al. ................. | 359/241 |

FOREIGN PATENT DOCUMENTS

| | | |
|---|---|---|
| EP | 1 037 096 A2 | 9/2000 |
| WO | WO 96/06372 | 2/1996 |
| WO | WO 98/53367 | 11/1998 |
| WO | WO01/73501 A2 | 10/2001 |

OTHER PUBLICATIONS

International Preliminary Report for PCT/GB2007/002203 dated on Dec. 31, 2008.
Search Report Under Section 17, UK Intellectual Property Ofice, Application No. GB0611703.0, Aug. 1, 2007, 1 page.

* cited by examiner

*Primary Examiner* — Omar Rojas
(74) *Attorney, Agent, or Firm* — Howard & Howard Attorneys PLLC

(57) ABSTRACT

A tuneable electro-optic modulator (1) comprising first and second spaced apart output optical waveguides (2, 3), each output optical waveguide comprising a coupled portion (12) optically coupled to a corresponding coupled portion (13) of the other output optical waveguide, the coupled portions defining a coupling region (14) therebetween; an optical source adapted to symmetrically provide an optical signal to the first and second output optical waveguides; a portion of each of the output optical waveguides having a signal electrode (6, 7) thereon; the modulator further comprising a central optical waveguide (15), at least a portion of which is arranged in the coupling region, the central optical waveguide having a tuning electrode (16) thereon.

24 Claims, 5 Drawing Sheets

TUNEABLE ELECTRO-OPTIC MODULATOR

This application claims priority to and all the advantages of International Application No. PCT/GB2007/002203, filed on Jun. 14, 2007, which claims priority to Great Britain Patent Application No. 0611703.0, filed on Jun. 14, 2006.

BACKGROUND OF THE INVENTION

1. Field of the Invention

The present invention relates to a tuneable electro-optic modulator and also to a method of tuning such a modulator. More particularly, but not exclusively, the present invention relates to a tuneable electro-optic modulator comprising first and second optically coupled electro-optic waveguides and a central optical waveguide having a tuning electrode therebetween.

2. Description of the Related Art

Mach Zehnder electro-optic modulators are known. The extinction ration of such modulators depends critically upon the optical coupling between the output waveguides. Small variations in coupling can produce large variations in extinction ratios. With modem optical waveguide fabrication technology it is difficult to control the ratio at which light couples between the waveguides with precision. Accordingly, the yield of such devices is low.

SUMMARY OF THE INVENTION

Accordingly, in a first aspect, the present invention provides a tuneable electro-optic modulator comprising first and second spaced apart output optical waveguides, each output optical waveguide comprising a coupled portion optically coupled to a corresponding coupled portion of the other output optical waveguide, the coupled portions defining a coupling region therebetween;

an optical source adapted to symmetrically provide an optical signal to the first and second output optical waveguides;

a portion of each of the output optical waveguides having a signal electrode thereon;

the modulator further comprising a central optical waveguide, at least a portion of which is arranged in the coupling region, the central optical waveguide having a tuning electrode thereon.

By altering the voltage on the tuning electrode one can adjust the coupling between the output waveguides so allowing for variations between devices. This increases manufacturing yield so reducing cost.

Preferably, the first and second output optical waveguides have the same effective refractive index.

The output optical waveguides can be the same width.

The output optical waveguides can be the same thickness.

Preferably the central optical waveguide has a different effective refractive index to the output optical waveguides.

The central optical waveguide can have a different width, is preferably narrower, than the output optical waveguides.

Preferably, the optical source comprises an optical splitter comprising an input port and first and second output ports for communication with the first and second output optical waveguides respectively.

The optical splitter can comprise a Y junction.

Preferably, each output optical waveguide comprises an electro-optic region having a signal electrode thereon and at least one passive region without a signal electrode thereon, the passive region being on the opposite side of the electro-optic region to the optical source.

The coupled portion of each output optical waveguide can comprise at least part of the passive region.

The coupled portion of each output optical waveguide can comprises the electro-optic region and the passive region, the electro-optic region and passive regions of one output optical waveguide being coupled to the corresponding electro-optic and passive regions respectively of the other output optical waveguide.

The signal electrodes can extend along between 50% and 80% of the length of the output optical waveguides, preferably between 50% and 70%, more preferably between 55% and 65%.

The ends of the output optical waveguides remote from the optical source can be connected together by a junction recombiner.

The electro-optic region of each output optical waveguide can be split into a plurality of sub regions by at least one passive region, the passive region and the corresponding passive region of the other output optical waveguide comprising coupled portions.

The electro-optic region of each output optical waveguide can be split into two sub regions by a coupled portion.

Alternatively, the electro-optic region of each output optical waveguide is split into a plurality of sub regions by a plurality of coupled portions.

The distance between the coupled portions of the two output optical waveguides can be less than the distance between the non coupled portions of the output optical waveguides.

Preferably, the tuneable electro-optic modulator comprises a plurality of central optical waveguides each having a tuning electrode, each central optical waveguide being arranged at least partially within a coupling region.

Preferably, the potential of at least one tuning electrode can be set independently of the others.

In a further aspect of the invention there is provided a method of tuning a tuneable electro-optic modulator comprising the steps of:

(a) providing a tuneable electro-optic modulator as claimed in any one of claims 1 to 19;

(b) symmetrically providing a continuous wave input optical signal to the output optical waveguides;

(c) applying RF potentials to the first and second signal electrodes of amplitudes $V_1$ and $V_2$ respectively to determine the transmission I of the modulator as a function of $\Delta v = V_1 - V_2$; and, (d) repeating step (c) with different values of tuning potential applied to the tuning electrode to determine a tuning potential at which at least one harmonic of the function $I(\Delta v)$ is a minimum.

Preferably, $V_1 = -V_2$. The harmonic can be the third harmonic. Preferably, the fifth harmonic is minimised in addition to the third harmonic.

In a further aspect of the invention there is provided a method of tuning a tuneable electro-optic modulator comprising the steps of (a) providing a tuneable electro-optic modulator according to any one of claims 1 to 19;

(b) symmetrically providing a continuous wave input optical signal to the output optical waveguides;

(c) applying RF potentials to the first and second signal electrodes of amplitude $V_1$ and $V_2$ respectively to determine the transmission I of the modulator as a function of $\Delta v = V_1 - V_2$; and, (d) repeating step (c) with different values for tuning potential applied to the tuning electrodes to determine a tuning potential at which the extinction ratio of the modulator is a maximum.

In a further aspect of the invention there is provided a tuneable electro-optic modulator comprising first and second output optical waveguides, optically coupled together along at least a portion of their length;

an optical source adapted to symmetrically provide an optical signal to the first and second output optical waveguides;

a portion of each of the output optical waveguides having signal electrodes thereon; and, a central waveguide between the first and second waveguides and extending substantially parallel thereto, the central waveguide having a tuning electrode thereon, the central waveguide extending into the region between the first and second waveguides where the first and second waveguides are optically coupled together.

BRIEF DESCRIPTION OF THE DRAWINGS

The present invention will now be described by way of example only and not in any limitative sense with reference to the accompanying drawings in which.

DETAILED DESCRIPTION OF THE INVENTION

Figure 1:
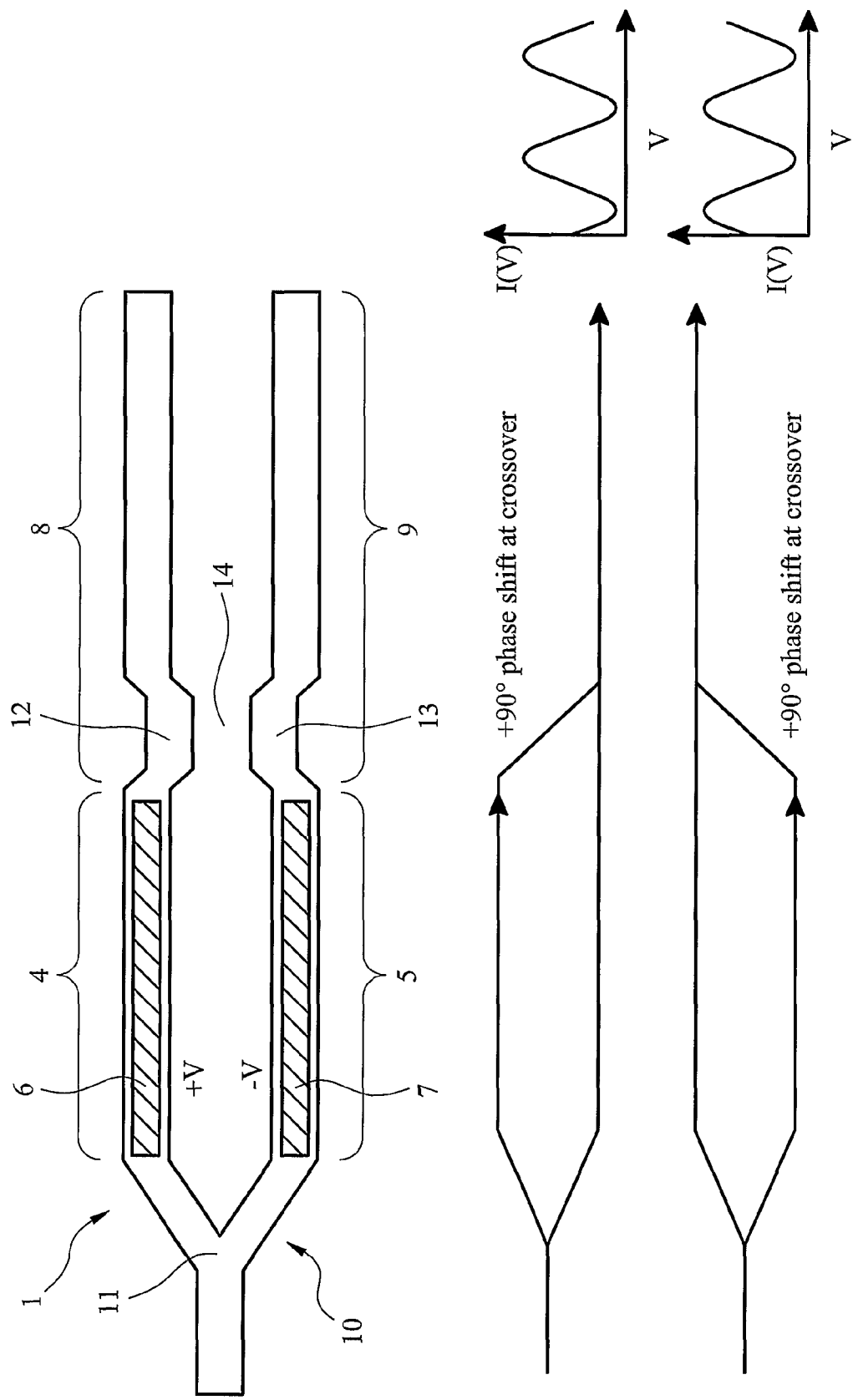
FIG. 1 shows a known Mach Zehnder electro-optic modulator.

Shown in FIG. 1 is a known Mach Zehnder modulator 1 comprising first and second output optical waveguides 2,3. Each of the optical waveguides 2,3 comprises an electro-optic region 4,5 having a signal electrode 6,7 thereon and a passive region 8,9 lacking an electrode. An optical source 10 comprising a Y junction splitter 11 connects the output optical waveguides 2,3 together. The Y junction splitter 11 is connected to the ends of the output optical waveguides 2,3 on the opposite side of the electro-optic regions 4,5 to the passive regions 8,9.

The output optical waveguides 2,3 are sufficiently far apart that the optical coupling between them is negligible. A portion of the passive region 8,9 of each optical waveguide 2,3 comprises a coupled portion 12,13. The distance between the two coupled portions 12,13 is less than the distance between the remainder of the optical waveguides 2,3 as shown. The coupled portions 12,13 are therefore optically coupled together. The gap between the coupled portions is the coupling region 14.

The operation of such modulators 1 is well known. Light received by the Y junction splitter 11 is symmetrically split and travels along the two output optical waveguides 2,3. With no voltage on the signal electrodes 6,7 the light in the two output waveguides 2,3 remains in phase as it travels along the two output optical waveguides 2,3. At the coupled portion 12,13 a fraction of the light in one output optical waveguide 2,3 will cross into the other. This fraction will experience a further 90 degree phase shift. It will then combine with the light in the other output optical waveguide 2,3.

If an RF potential is applied to a signal electrode 6,7 the light passing beneath the electrode 6,7 interacts with the potential so changing the phase of the light. If different potentials are applied to the two signal electrodes 6,7 light in one of the output optical waveguides 2,3 moves slightly out of phase with light in the other. Again, on reaching the coupled portion 12,13 a portion of the light in each output optical waveguide 2,3 will cross to the other output optical waveguide 2,3 (again experiencing a 90 degree phase shift) before combining with the light in the other output optical waveguide 2,3. As the phase relation between the two portions is now different combining the two portions will result in a different output optical intensity.

In a Mach Zehnder modulator 1 with an on to off drive voltage of $V_{\pi 1}$ (i.e. the voltage required for a $\pi$ phase shift) and with RF voltages +V and −V applied to the signal electrodes 6,7 the optical fields to be added at each coupled portion 12,13 are $$E_1 \exp(+j(\pi V/V_{\pi 1})\sin(\Omega t)+j\pi/4) \text{ and}$$

$$E_1 \exp(-j(\pi V/V_{\pi 1})\sin(\Omega t)-j\pi/4)$$

Where $E_1$ is the peak optical field amplitude in each of the two electro-optic waveguides 2,3 assuming a 50:50 split at the coupled portion. The signal applied to the two signal electrodes 6,7 is assumed to have the form $\pm V \sin(\Omega t)$. The $\pm j\pi/4$ terms are used to bias the device 1 to quadrature (the mid intensity point) and corresponds to the $\pi/2$ phase difference between the two optical fields. Plotted in schematic form in FIG. 1 is the output intensity I (or alternatively transmission) in each of the output optical waveguides 2,3 as a function of V obtained by combining these fields together. More generally, the output intensity I is expressed as I($\Delta v$) where $\Delta v = V_1 - V_2$ when RF voltages $V_1$ and $V_2$ are applied to the signal electrodes 6,7.

In practice however it is difficult to manufacture a modulator 1 which very precisely splits the light 50:50 at the coupled portion 12,13. Small variations in etch depth affect the coupling. There is therefore a large variation in extinction ratios (Imax/Imin) for such modulators 1 manufactured by modern fabrication techniques.

Figure 2:
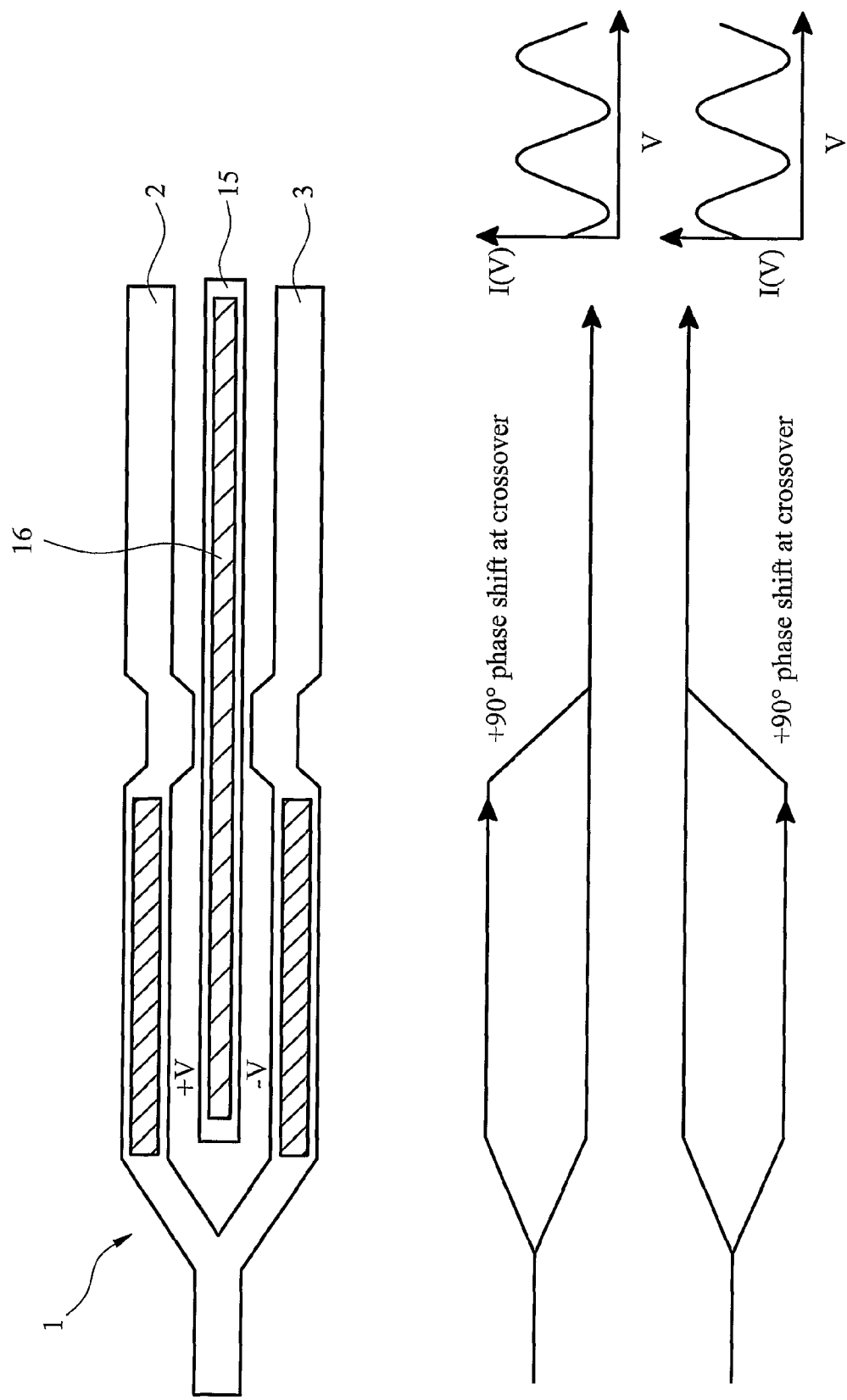
FIG. 2 shows a tuneable electro-optic modulator according to the invention.

Shown in FIG. 2 is a tuneable electro-optic modulator 1 according to the invention. This is similar to that of FIG. 1 except a central optical waveguide 15 is located between the output optical waveguides 2,3 and extends generally parallel thereto. A tuning electrode 16 is located on the central optical waveguide 15. The central optical waveguide 15 extends into the coupling region 14 between the coupled portions 12,13.

The two output optical waveguides 2,3 have the same dimensions and have the same effective refractive index. The central optical waveguide 15 is narrower and so has a very different effective refractive index. This is to minimise the amount of light that gets trapped in the central optical waveguide 15 rather than passing underneath it. If all the optical waveguides 2,3,15 had the same effective refractive index light could couple from one of the output optical waveguides 2,3 to the central waveguide 15 and back again rather than crossing between the output optical waveguides 2,3 as required. In the current embodiment the width of the central optical waveguide 15 is much less than that of the output optical waveguides 2,3 to reduce loss. In an alternative embodiment the width of the central optical waveguide 15 is much larger than that of the output optical waveguides 2,3.

By varying the voltage on the tuning electrode 16 one can alter the optical coupling between the coupled portions 12,13 of the output optical waveguides 2,3. The modulator 1 can therefore be tuned until the extinction ration is a maximum so compensating for any manufacturing variations.

Figure 3:
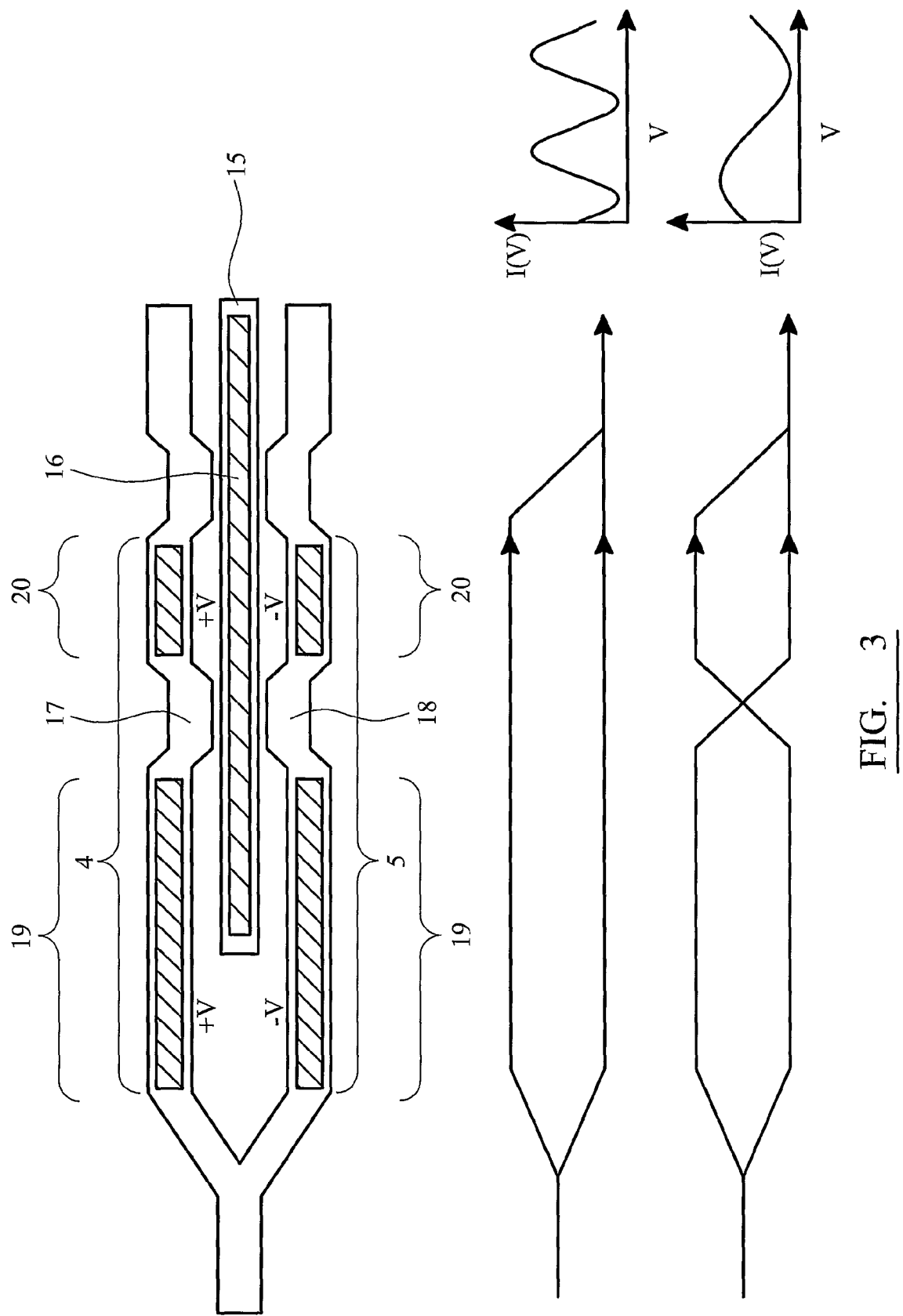
FIG. 3 shows a linearised tuneable electro-optic modulator according to the invention.

Shown in FIG. 3 is a further embodiment of an electro-optic modulator 1 according to the invention. In this embodiment the electro-optic region 4,5 of each waveguide is split into two 19,20 having a passive region 17,18 therebetween. These two additional passive regions 17,18 are each coupled portions optically coupled together. The additional coupled portions provide additional optical paths through the modulator 1. The extra optical paths are shown schematically in FIG. 3.

The fields which combine in this modulator 1 are (again assuming voltages $\pm V \sin(\Omega t)$ on the signal electrodes)

$$E_1 \exp(+j(\pi V/V_{\pi 1})\sin(\Omega t) + j\pi/4)$$

$$E_1 \exp(-j(\pi V/V_{\pi 1})\sin(\Omega t) - j\pi/4)$$

$$jE_2 \exp(+j(\pi V/V_{\pi 2})\sin(\Omega t) - j\pi/4)$$

$$jE_2 \exp(-j(\pi V/V_{\pi 2})\sin(\Omega t) + j\pi/4)$$

The first two terms are as before. The additional terms are similar but have different $V_\pi = V_{\pi 2}$ and are also phase shifted by an extra 90 degrees. The modulator 1 is arranged such that the extra paths take most of the optical power (ie $E_1 < E_2$). This means that the slowly varying trace is the main sinusoidal contribution to the output signal and the faster varying trace is a linearising term. By choosing the correct ration of $E_1$ to $E_2$ the faster trace will add to the slower trace in exactly the correct amplitude and phase to give a linearised optical transmission against signal voltage response. The embodiment of FIG. 3 is therefore referred to as a linearised electro-optic modulator 1.

The ratio of the lengths of electro-optic regions 19,20 before and after the central coupled portions 17,18 determines the $V_{\pi 1}:V_{\pi 2}$ ratio. The correct $E_1:E_2$ ratio is dependent on the $V_{\pi 1}:V_{\pi 2}$ ratio and needs to be set very accurately.

Accordingly, it is difficult to manufacture a linearised electro-optic modulator 1 similar to that of FIG. 3 without a central waveguide 15. With a central waveguide 15 however one can adjust the tuning potential on the tuning electrode 16 so adjusting the coupling between the output waveguides 2,3 and hence the ratio $E_1:E_2$. At the correct value of $E_1:E_2$ the third harmonic of the transmission $I(\Delta v)$ is minimised.

In a further embodiment of a linearised tuneable electro-optic modulator 1 according to the invention (not shown) the electro-optic region 4,5 of each output waveguide 2,3 is split into three sub regions separated by two coupled portions, each coupled portion comprising a passive region. One can tune such a modulator 1 to minimise the fifth harmonic of $I(\Delta v)$ in addition to the third harmonic.

Figure 4:
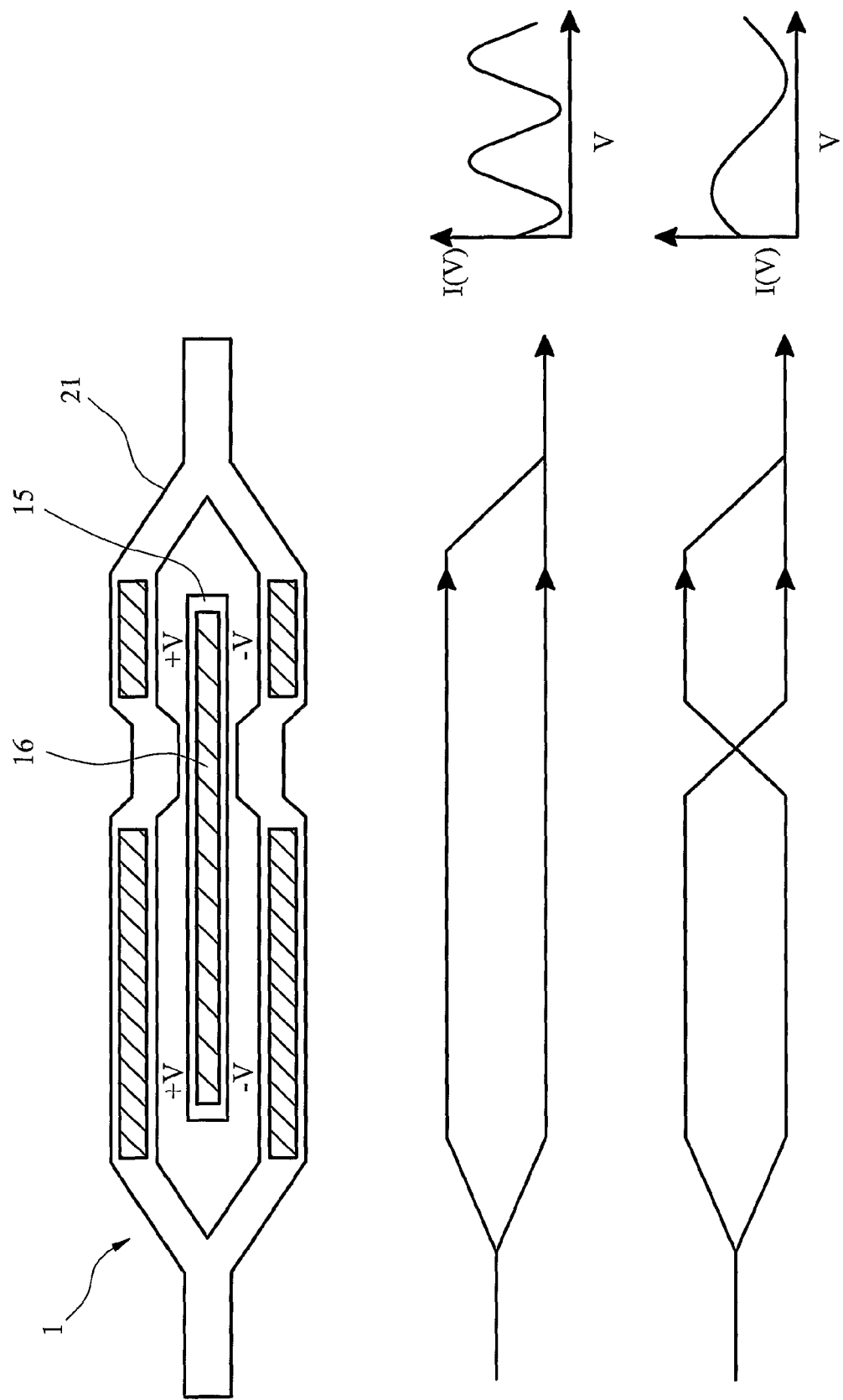
FIG. 4 shows a further embodiment of a linearised tuneable electro-optic modulator according to the invention; and, FIG. 5 shows a further embodiment of a linearised electro-optic modulator according to the invention.

Shown in FIG. 4 is a further embodiment of a linearised tuneable electro-optic modulator 1 according to the invention. This embodiment is similar to that of FIG. 2 except the ends of the output optical waveguides 2,3 are connected together by a Y junction recombiner 21. Because this is a symmetric combiner 21 the modulator 1 is biased at maximum intensity rather than at quadrature so it needs to be biased such that both sinusoidal I-V responses are at the correct quadrature points when the RF signal is zero.

Alternative embodiments (not shown) comprise different combiners 21 such as 2×2 or 2×1 multimode interference (MMI) combiners 21.

Figure 5:
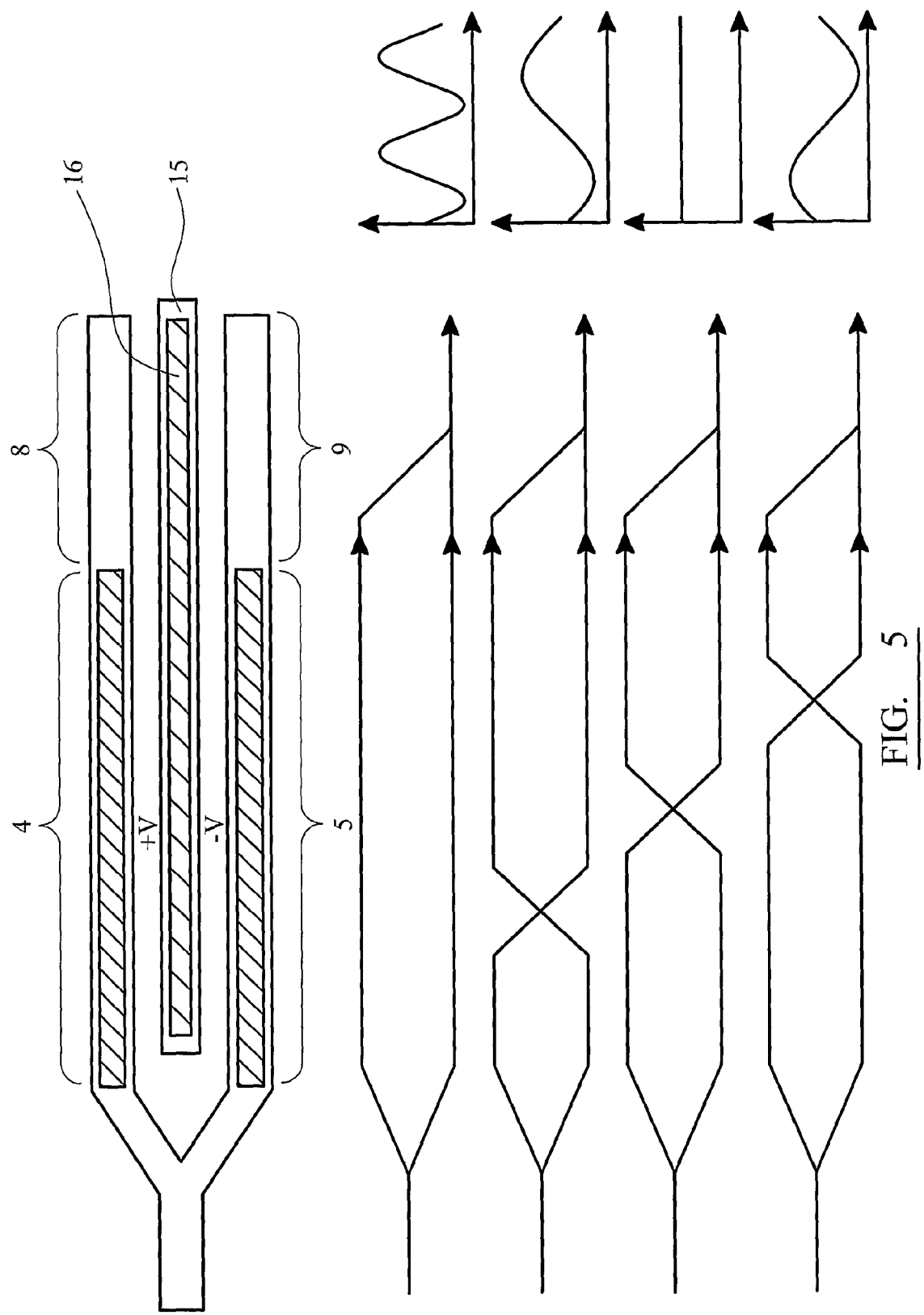

Shown in FIG. 5 is a further embodiment of a tuneable linearised electro-optic modulator 1 according to the invention. In this embodiment the output waveguides 2,3 are coupled together along their length. The coupled portion of each optical waveguide 2,3 therefore comprises both the electro-optic region 4,5 and the passive region 8,9. The modulator 1 provides a plurality of optical paths along its length as schematically shown in FIG. 5. Again, the modulator 1 can be linearised by correct application of a tuning voltage to the tuning electrode 16 on the central optical waveguide 15.

All of the modulators 1 according to the invention described can be manufactured using GaAs/AlGaAs optical waveguides 2,3,15. Alternatively, they could be manufactured from indium phosphide based materials or AlGaAs. $LiNbO_3$ waveguides are also possible. Lithium tantalite or barium titanate waveguides 2,3,15 are also possible as are waveguides 2,3,15 comprising electro-optic polymer materials.

The invention claimed is:

1. A tuneable electro-optic modulator comprising
    first and second spaced apart output optical waveguides, each output optical waveguide comprising a coupled portion optically coupled to a corresponding coupled portion of the other output optical waveguide, the coupled portions defining a coupling region therebetween;
    an optical source adapted to symmetrically provide an optical signal to the first and second output optical waveguides;
    a portion of each of the output optical waveguides having a signal electrode thereon; and
    a central optical waveguide, at least a portion of which is arranged in the coupling region, the central optical waveguide having a tuning electrode thereon;
    wherein each output optical waveguide comprises an electro-optic region having a signal electrode thereon and at least one passive region without a signal electrode thereon, the passive region being on the opposite side of the electro-optic region to the optical source, and wherein the coupled portion of each output optical waveguide comprises the electro-optic region and the passive region, the electro-optic region and passive regions of one output optical waveguide being coupled to the corresponding electro-optic and passive regions respectively of the other output optical waveguide.

2. A tuneable electro-optic modulator as claimed in claim 1, wherein the first and second output optical waveguides have the same effective refractive index.

3. A tuneable electro-optic modulator as claimed in claim 2, wherein the output optical waveguides are the same width.

4. A tuneable electro-optic modulator as claimed in claim 3, wherein the output optical waveguides are the same thickness.

5. A tuneable electro-optic modulator as claimed in claim 4, wherein the central optical waveguide has a different effective refractive index to the output optical waveguides.

6. A tuneable electro-optic modulator as claimed in claim 5, wherein the central optical waveguide has a different width than the output optical waveguides.

7. A tuneable electro-optic modulator as claimed in claim 6, wherein the optical source comprises an optical sputter comprising an input port and first and second output ports for communication with the first and second output optical waveguides respectively.

8. A tuneable electro-optic modulator as claimed in claim 7, wherein the optical splitter comprises a Y junction.

9. A tuneable electro-optic modulator as claimed in claim 1, wherein the coupled portion of each output optical waveguide comprises at least part of the passive region.

10. A tuneable electro-optic modulator as claimed in claim 1, wherein the signal electrodes extend along between 50% and 80% of the length of the output optical waveguides.

11. A tuneable electro-optic modulator as claimed in claim 1, wherein the ends of the output optical waveguides remote from the optical source are connected together by a junction recombiner.

12. A tuneable electro-optic modulator as claimed in claim 1, wherein the electro-optic region of each output optical waveguide is split into a plurality of sub regions by at least one passive region, the passive region and the corresponding passive region of the other output optical waveguide comprising coupled portions.

13. A tuneable electro-optic modulator as claimed in claim 12, wherein the electro-optic region of each output optical waveguide is split into two sub regions by a coupled portion.

14. A tuneable electro-optic modulator as claimed in claim 12, wherein the electro-optic region of each output optical waveguide is split into a plurality of sub regions by a plurality of coupled portions.

15. A tuneable electro-optic modulator as claimed in claim 12, wherein the distance between the two output optical waveguides at the coupled portions is less than the distance between the output optical waveguides at the electro-optic regions.

16. A tuneable electro-optic modulator as claimed in claim 14, comprising a plurality of central optical waveguides each having a tuning electrode, each central optical waveguide being arranged at least partially within a coupling region.

17. A tuneable electro-optic modulator as claimed in claim 16, wherein the potential of at least one tuning electrode can be set independently of the others.

18. A method of tuning a tuneable electro-optic modulator comprising the steps of:
(a) providing first and second spaced apart output optical waveguides, each output optical waveguide comprising a coupled portion optically coupled to a corresponding coupled portion of the other output optical waveguide, the coupled portions defining a coupling region therebetween, an optical source adapted to symmetrically provide an optical signal to the first and second output optical waveguides, a portion of each of the output optical waveguides having a signal electrode thereon, and a central optical waveguide, at least a portion of which is arranged in the coupling region, the central optical waveguide having a tuning electrode thereon;
(b) symmetrically providing a continuous wave input optical signal to the output optical waveguides;
(c) applying RF potentials to the first and second signal electrodes of amplitudes $V_1$ and $V_2$ respectively to determine the transmission I of the modulator as a function of $\Delta v = V_1 - V_2$; and,
(d) repeating step (c) with different values of tuning potential applied to the tuning electrode to determine a tuning potential at which at least one harmonic of the function $I(\Delta v)$ is a minimum.

19. A method as claimed in claim 18, wherein $V_1 = -V_2$.

20. A method as claimed in claim 18, wherein the harmonic is the third harmonic.

21. A method as claimed in claim 20, wherein the fifth harmonic is minimised in addition to the third harmonic.

22. A method of tuning a tuneable electro-optic modulator comprising the steps of
(a) providing first and second spaced apart output optical waveguides, each output optical waveguide comprising a coupled portion optically coupled to a corresponding coupled portion of the other output optical waveguide, the coupled portions defining a coupling region therebetween, an optical source adapted to symmetrically provide an optical signal to the first and second output optical waveguides, a portion of each of the output optical waveguides having a signal electrode thereon, and a central optical waveguide, at least a portion of which is arranged in the coupling region, the central optical waveguide having a tuning electrode thereon;
(b) symmetrically providing a continuous wave input optical signal to the output optical waveguides;
(c) applying RF potentials to the first and second signal electrodes of amplitude $V_1$ and $V_2$ respectively to determine the transmission I of the modulator as a function of $\Delta v = V_1 - V_2$; and,
(d) repeating step (c) with different values for tuning potential applied to the tuning electrodes to determine a tuning potential at which the extinction ratio of the modulator is a maximum.

23. A tuneable electro-optic modulator comprising
first and second output optical waveguides, optically coupled together along at least a portion of their length;
an optical source adapted to symmetrically provide an optical signal to the first and second output optical waveguides;
a portion of each of the output optical waveguides having signal electrodes thereon; and,
a central waveguide between the first and second waveguides and extending substantially parallel thereto, the central waveguide having a tuning electrode thereon, the central waveguide extending into the region between the first and second waveguides where the first and second waveguides are optically coupled together;
wherein each output optical waveguide comprises an electro-optic region having a signal electrode thereon and at least one passive region without a signal electrode thereon, the passive region being on the opposite side of the electro-optic region to the optical source, and wherein the coupled portion of each output optical waveguide comprises the electro-optic region and the passive region, the electro-optic region and passive regions of one output optical waveguide being coupled to the corresponding electro-optic and passive regions respectively of the other output optical waveguide.

24. A tuneable electro-optic modulator as claimed in claim 1, wherein the signal electrodes extend along between 55% and 65% of the length of the output optical waveguides.

* * * * *